JOHN BALLOU.
Improvement in Furnace-Pots.
No. 115,677.                                       Patented June 6, 1871.
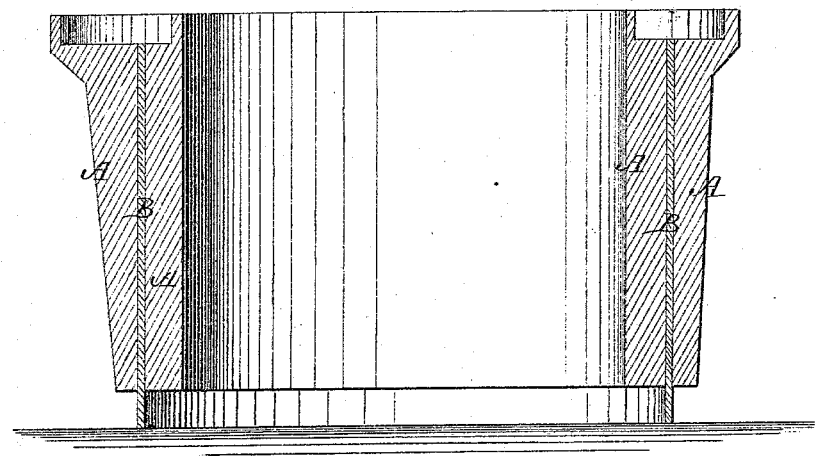
Witnesses:
Chas. Nida
Wm H. C. Smith
Inventor:
J. Ballou,
per Mumm & Co
Attorneys.

115,677

UNITED STATES PATENT OFFICE.

JOHN BALLOU, OF BOSTON, MASSACHUSETTS.

IMPROVEMENT IN FURNACE-POTS.

Specification forming part of Letters Patent No. 115,677, dated June 6, 1871.

*To all whom it may concern:*

Be it known that I, JOHN BALLOU, of Boston, in the county of Suffolk and State of Massachusetts, have invented a new and Improved Furnace-Pot; and I do hereby declare that the following is a full, clear, and exact description thereof, which will enable others skilled in the art to make and use the same, reference being had to the accompanying drawing forming part of this specification, in which the drawing represents a central vertical section of the improved furnace-pot.

This invention has for its object to prevent the escape of noxious gases through the pores of cast-iron furnace-pots; and consists in producing such pots with external, internal, or embedded wrought-iron jackets. The close-pored wrought iron prevents the escape of the gas without materially adding to the expense or weight of the jacket.

A in the drawing represents the cast-iron furnace-pot, of suitable size and shape. B is a wrought-iron jacket embedded in the cast-iron pot or fitted around or within the same, so as to prevent the escape of gases that would otherwise readily pass through the pores of the red-hot cast-iron.

Having thus described my invention, I claim as new and desire to secure by Letters Patent—

The impermeable wrought-iron jacket furnace-pot, herein described.

JOHN BALLOU.

Witnesses:
J. R. CUMMINGS,
GEO. BURNHAM.